United States Patent
Schroder et al.

[11] 3,713,920
[45] Jan. 30, 1973

[54] METHOD OF PRODUCING HEAT IN A CHEMICAL REACTOR

[75] Inventors: Johann Schroder, Aachen, Germany; Willem Ludovicus Nicolaas van der Sluys, Emmasingel, Eindhoven, Netherlands

[73] Assignee: U.S. Phillips Corporation, New York, N.Y.

[22] Filed: Oct. 1, 1970

[21] Appl. No.: 77,120

[30] Foreign Application Priority Data

Oct. 3, 1969 Netherlands ..................... 6915057

[52] U.S. Cl. .................. 149/109, 252/70, 263/52, 44/3, 60/211

[51] Int. Cl. .................................................. C06d 5/02
[58] Field of Search ....... 252/70; 44/1, 2, 3; 149/109; 263/52; 60/211

[56] References Cited

UNITED STATES PATENTS 3,325,318  6/1967  Pauliukonis ......................... 149/109

Primary Examiner—Stephen J. Lechert, Jr.
Attorney—Frank R. Trifari

[57] ABSTRACT

Production of heat by reacting a mixture of $SF_6$ and $Cl_2$ with Li in a chemical reactor.

2 Claims, 1 Drawing Figure

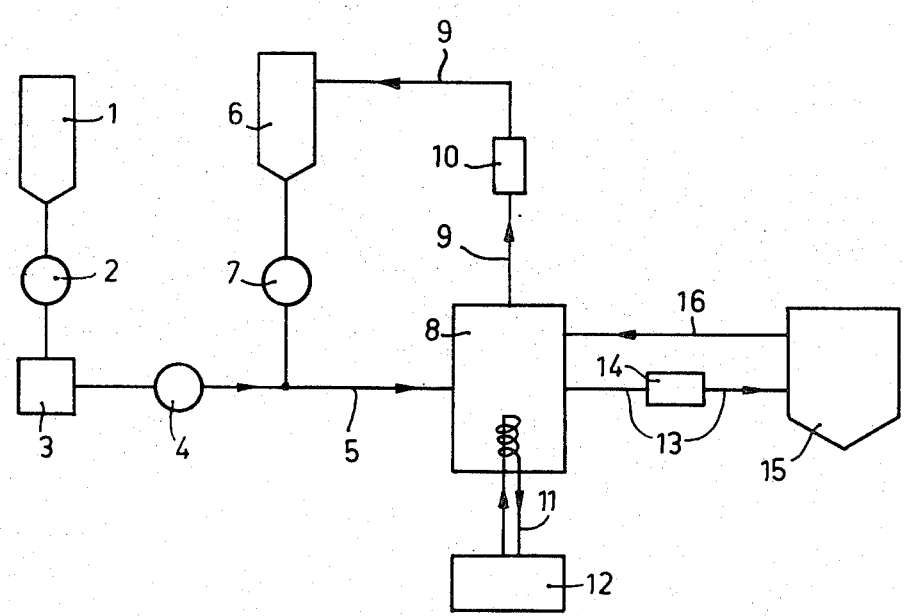

METHOD OF PRODUCING HEAT IN A CHEMICAL REACTOR

The invention relates to a method of producing heat by reacting sulphur hexafluoride with lithium in a chemical reactor.

Such a method is known from U.S. Pat. No. 3,325,318. In the method described in this patent specification lithium or a lithium alloy is reacted with sulphur hexafluoride while forming a solid reaction product comprising lithium sulphide and lithium fluoride.

According to this patent specification heat can be extracted from the reacting mass by means of a working fluid flowing through tubes which are embedded in the stationary bed consisting of mainly lithium and solid reaction products of lithium and sulphur hexafluoride. A uniform reaction process and an efficient extraction of the reaction heat in the presence of solid reaction products can hardly be achieved. This particularly applies if heat must be produced over a comparatively long period and in great quantities in such a system.

The volume of the reaction products is generally not equal to the volume of the alloy which is used as a basic material. Under these circumstances a closed system operating independently of the exterior is difficult to realize on the basis of the method described in the U.S. Pat. No. 3,325,318.

It was found from experiments that a homogeneous melt of the reaction products is obtained only at temperature of more than 815° C. when reacting lithium with $SF_6$.

According to a patent application not yet published in the name of the applicant a chemical reactor is used which includes at least two interconnected spaces and a pump. One of these spaces is the actual reaction space. At the start of the reaction the reactor contains a molten alloy of lithium and calcium in an atomic ratio of 4 : 1. The temperature is maintained at a value of between 800° C. and 900° C. during the reaction.

The said alloy provides the advantage that no change in volume occurs upon reaction with $SF_6$. $SF_6$ is blown into the melt in the reaction space. The liquid contents of the chemical reactor are circulated by means of the pump. The molten salts formed in the reaction space and the non-reacted part of the alloy then flow along heat exchangers and subsequently through one or more sedimentation spaces which also serve as spare containers. The salts formed during the reaction and having a greater specific weight than the metal melt are deposited in these sedimentation spaces. The alloy subsequently flows from the sedimentation space back into the reaction space. When reacting a lithium-calcium mixture with $SF_6$ lithium sulphide and calcium sulphide are formed in addition to lithium fluoride and calcium fluoride. Part of these sulphides, particularly lithium sulphide, dissolves in the molten fluorides of lithium and calcium at the temperature prevailing in the chemical reactor. The undissolved part is finely dispersed and does not provide special difficulties in reactors which are intended to produce heat for only a short time.

However, interfering effects may occur as a result of clogging by solid calcium sulphide in chemical reactors in which heat is produced continuously over a comparatively long period. In fact, it was found in practice that lithium sulphide, which is largely soluble in the first instance during reaction in the fluoride melt, reacts with calcium which is present in the non-reacted part of the alloy in accordance with:

$$Li_2S + Ca \rightarrow CaS + 2Li.$$

Since CaS is only sparingly soluble in the fluoride melt, CaS precipitates may be formed on the tubes of the heat exchangers when the reactor is continuously used over a comparatively long period for producing heat. The transfer of heat is detrimentally influenced thereby and clogging may occur.

The object of the present invention is to provide a method of producing heat in a chemical reactor in which lithium is reacted with $SF_6$ and in which the volume of the reacting mass remains constant or substantially constant while no insoluble substances are formed in the melt of the reaction products.

According to the invention this is possible in a method which is characterized in that in a chemical reactor a gaseous mixture of sulphur hexafluoride and chlorine in a molecular ratio of between 10 : 1 and 10 : 4.5 is blown into molten lithium at a temperature of more than approximately 775° C., the liquid mixture of lithium and reaction products of the said gases and lithium being passed along heat exchangers and subsequently into one or more sedimentation spaces in which the liquid reaction products are deposited and from which the molten lithium is passed back into the reactor.

The following reaction takes place in the reaction space of the chemical reactor when blowing in the $SF_6 - Cl_2$ mixture.

$$(8 + 2n) Li + SF_6 + nCl_2 \rightarrow 6LiF + Li_2S + 2nLiCl$$

in which $n$ is the number of gram molecules of chlorine in one gram molecule of $SF_6$. According to the invention $n$ lies between 0.1 and 0.45. The limitation of the chlorine content has the following significance:

The reaction yields a maximum energy if the chlorine content is small. At a quantity of 0.45 gam mol. $Cl_2$ per grammol. of $SF_6$ the difference in energy supplied by the reaction between lithium and $SF_6$ without $Cl_2$ is approximately 6 percent. When increasing the chlorine content and difference between the specific volume of the reaction products and the specific volume of lithium increases in a positive sense. When decreasing the chlorine content this difference decreases and becomes negative below $n = 0.21$: the specific volume of the reaction products is then smaller than the specific volume of lithium. When increasing the chlorine content the melting point of the mixture of reacting products decreases. For chlorine contents of between 0.1 and 0.45 per grammol. of $SF_6$ the melting point of the mixture of reaction products is less than 800° C., the loss of energy is 6 percent at a maximum and the deviation from the volume constancy during reaction is ± 3 percent. Fluid homogenous melts of the reaction products are obtained while operating temperatures of less than 800° C. may be used so that the choice of material from the structure of the reactor will be greater than is the case at operating temperatures of more than 800° C. The method is preferably performed with a mixture of $SF_6$ and $Cl_2$ which contains 0.21 grammol. of $Cl_2$ per grammol of $SF_6$. At this ratio the specific volume of the reaction products is found to be equal to the specific volume of lithium. The reaction yields only approximately 1 percent less heat than does the reaction between lithium and $SF_6$. It is found that the reaction products form a homogeneous fluid melt at more than approximately 775°C.

The temperature range of between 775° C. and approximately 850° C. is suitable for supplying calorific energy to engines in which a working fluid is traversing a thermodynamic cycle between an expansion space at a high temperature and a compression space at a low temperature. An example of such an engine is a hot gas engine. Heat can then be applied to the engine by establishing heat-exchanging contact between the liquid mass in the chemical reactor and the hot gas engine heater usually consisting of a system of conduits through which the working fluid flows on its path to and from the expansion space. If desired, the heat may alternatively be transferred with the aid of a heat-transporting medium such as a liquid Na-K alloy which circulates in a system which at one end is in heat-exchanging contact with the reaction space of the chemical reactor and at the other end with the heater of the hot gas engine. The mixture of lithium sulphide, lithium fluoride and lithium chloride formed in the method according to the invention and being completely fluid above 775° C. on the one hand and the non-reacted lithium on the other hand are mutually soluble to a slight extent only. The specific density of the said salts is greater than that of lithium. This creates the possibility of separating the salts in a liquid state from the liquid lithium by circulating the dispersion between the reaction space and one or more sedimentation spaces which may also serve as spare containers. The flow rate in the sedimentation space will then preferably be chosen to be smaller than the flow rate in the rest of the system. The method according to the invention provides the advantage that the reaction velocity can be maintained substantially constant at a constant supply of the mixture of sulphur hexafluoride and chlorine to the reactor, for the concentration of lithium in the reactor remains substantially constant over a considerable part of the period required for complete reaction of the originally present lithium. Liquid $SF_6$ and $Cl_2$ are found to be miscible in all ratios. The mixtures may be obtained by pressing the desired quantities of $Sf_6$ and $Cl_2$ in the desired ratio in a pressure vessel.

The lithium used for the method may have a technical quality.

In order that the invention may be readily carried into effect an embodiment thereof will now be described in detail, by way of example, with reference to the accompanying diagrammatic drawing which comprises a single FIGURE and shows the structure of a chemical reactor.

A liquid mixture of $SF_6$ and $Cl_2$ in the ratio of 1 : 0.21 in gram molecules flows from a container 1 through the control valve 2 into the expansion space 5 in which the liquid is immediately and completely evaporated so that the composition of the gas mixture id equal to that of the liquid. The saturation pressure of the mixture is approximately 27 atmospheres at 25° C. The pressure in the expansion space 3 is maintained at 15 atmospheres (25° C.) by means of the automatically operating control valve 2. The gas mixture is allowed to pass at a pressure of 6 atmospheres through the reduction valve 4 into a conduit 5 through which also argon gas flows from the container 6 through the reduction valve 7 to the reaction space 8. The reaction space 8 contains liquid lithium at a temperature of 800° C. Lithium and the gas mixture are chemically reacted in the reaction space 8 in accordance with $$8.42\ Li + SF_6 + 0.21\ Cl_2 \rightarrow 6\ LiF + Li_2S + 0.42\ LiCl.$$

The heat then produced is transferred from the reactor 8 to a hot gas engine 12 with the aid of the heat exchanger 11 comprising a conduit through which a liquid Na-K alloy is circulated. The argon is pumped back through the conduit 9 into the container 6 with the aid of the pump 10.

The liquid lithium and the salts formed during the reaction are pumped through the conduit 13 into the container 15 with aid of the pump 14. After the lithium salts formed during the reaction have deposited in the container, the liquid lithium flows back from said container through the conduit 16 into the reaction space 8.

The invention provides the advantage that the method may be used in closed systems operating independently of the exterior. Both a great increase and a great decrease of the volume of the fuel must be avoided during reaction. A constant volume is preferred. The latter may be effected with the aid of the method according to the present invention.

What is claimed is:

1. A method of producing calorific energy by reacting sulfur hexafluoride with lithium in a chemical reactor said method comprising blowing, in a chemical reactor, a gaseous mixture of sulfur hexafluoride and chlorine in a molecular ratio of between 10:1 and 10:4.5 into molten lithium at a temperature of more than about 775° C., passing the resultant liquid mixture of lithium and liquid reaction products of lithium and said gaseous mixture along heat exchangers and then into at least one sedimentation space in which the liquid reaction products are deposited and then returning the molten lithium back into the reactor.

2. A method as claimed in claim 1 wherein, the molecular ratio between $SF_6$ and $Cl_2$ is 10 : 2.1.

* * * * *